US006997824B2

(12) United States Patent
Cranman (10) Patent No.: US 6,997,824 B2
(45) Date of Patent: Feb. 14, 2006

(54) GOLF BALL MARK REPAIR TOOL

(76) Inventor: Roy M. Cranman, 4651 Roswell Rd., Suite I-804, Atlanta, GA (US) 30342

( * ) Notice: Subject to any disclaimer, the term of this patent is extended or adjusted under 35 U.S.C. 154(b) by 0 days.

(21) Appl. No.: 10/900,754

(22) Filed: Jul. 28, 2004

(65) Prior Publication Data

US 2005/0032591 A1 Feb. 10, 2005

Related U.S. Application Data

(60) Provisional application No. 60/524,693, filed on Nov. 24, 2003, provisional application No. 60/492,851, filed on Aug. 6, 2003.

(51) Int. Cl.
*A63B 57/00* (2006.01)
(52) U.S. Cl. ...................................... 473/408
(58) Field of Classification Search ................ 473/408, 473/286; D21/793; 172/378–380
See application file for complete search history.

(56) References Cited

U.S. PATENT DOCUMENTS

| 3,138,211 | A | * | 6/1964 | Blom | 172/378 |
| 5,322,130 | A | * | 6/1994 | Ryden | 172/378 |
| 5,730,226 | A | * | 3/1998 | Kendall | 172/378 |
| 5,778,986 | A | * | 7/1998 | Davis | 172/378 |
| 5,853,336 | A | * | 12/1998 | Hufgard | 473/408 |
| D424,151 | S | * | 5/2000 | Miura | D21/793 |
| D434,825 | S | * | 12/2000 | Miura | D21/793 |

* cited by examiner

*Primary Examiner*—Steven Wong
(74) *Attorney, Agent, or Firm*—George R. Reardon (57) ABSTRACT

A pocket-sized hinged mechanical golf ball mark repair device for the proper repair of ball marks on a golf putting green. The hinging action squeezes the damaged sod together in one or two easy motions without destroying the roots; repairs the ball mark; thus expediting the repair/ growth of the damaged green. The device is enabled for display of promotional information.

2 Claims, 14 Drawing Sheets

FIG. 13 how it works:

UNREPAIRED BALL MARK

WITH YOUR FINGERS ON PRONGS, INSERT MARK MENDER UNTIL IT STOPS. ADJUCT WIDTH OF PRONGS TO SIZE OF BALL MARK.

SQUEEZE TOOL ONE OR MORE TIMES AS NEEDED, AND REMOVE FROM GREEN. FIRMER GREENS OR LARGER MARKS MAY REQUIRE SEVERAL SQUEEZES.

TAMP DOWN REPAIRED BALL MARK WITH YOUR PUTTER. YOU'RE DONE!

FIG. 14

GOLF BALL MARK REPAIR TOOL

Claim is hereby made for the benefit of U.S. Provisional Application No. 60/492,851 filed Aug. 6, 2003 and U.S. Provisional Application No. 60/524,693 filed Nov. 24, 2003 incorporated herein in their entirety by reference.

BACKGROUND

1. Field of the Invention

The present invention relates to golf green repair tools and the like.

2. Background of the Invention

The present invention relates to the field of mechanical turf repair tools for golf greens.

During the game of golf small amounts of damage are sometimes caused on golf greens. One example of such a small damage is the indentation made in a green by the golf ball when it is lofted or driven toward a green and falls onto it from a relatively high altitude.

Putting greens should be as free as possible from damage and irregularities of all kinds, but especially those caused by pitch marks. Ball marks that are poorly repaired, or not repaired at all, are a major factor that limits turf quality and playing conditions on putting greens. It is well documented in many golf industry publications that an improperly repaired ball mark may take two to three times longer to grow back to its original pristine state than one that is properly repaired.

It is each player's obligation to repair his/her divots as they occur. This is generally done using either a golf tee or one of countless designs of traditional divot repair tools sold and/or given away at most golf shops. These traditional divot repair tools usually include a hard flat device approximately one to four inches long with one, two or three prongs that are inserted into the grass on the putting green and then turned or lifted to smooth the damaged area. They are generally small enough to fit comfortably into a golfer's pocket.

The improper use of a traditional fixed divot repair tool can seriously damage the roots of the grass. Regrettably most golfers do not use the traditional tool properly. In fact, despite continued efforts by golf courses and other organizations to educate golfers on the proper method, the problem continues to persist. This problem is because of the inherent design flaw of the existing traditional divot repair tools that actually encourages improper use.

The commercially available turf repair devices use variations of the stationary prong(s) design, generally using two prongs. This design does not lend itself to golfers adequately repairing divots on the green. These tools are employed to pry up green indentations, but not to pull together separated turf.

Further, the present commonly used tool requires several movements by the golfer from two or more sides of the divot that takes time to manage properly. Therefore, it would be a significant improvement to the maintenance of golf course greens everywhere if there were a tool that could, quickly, simply and properly repair ball marks.

Therefore the need exists for a golf ball mark repair tool that can be used by novice golfers with minimal instruction to properly repair ball marks. Additionally the need exists for a golf ball repair tool that can be used by experienced golfers to efficiently and effectively repair ball marks. Also, the need exists for a unique golf accessory enabled for advertising and promotional purposes.

U.S. Pat. No. 3,120,388 to Doble discloses a Golfer's Helper that combines a two-pronged repair tool with a magnetic ball marker in order to remind the golfer to repair the divot. The limitation of the Doble patent is that the two-prong design is inefficient for repairing indentations in the green and most golfers do not have the knowledge or skill to effectively use the tool.

In contrast, the device shown by the Miura patent, U.S. Pat. No. D424151, shows a combined putting practice device and divot repair tool. It includes a hinged design to accommodate the putting practice feature. The limitation of the Miura patent is that the hinged design shown is inefficient for easily pulling turf together to facilitate repair and re-growth of the turf on the green.

SUMMARY OF THE INVENTION

The present invention addresses these and other needs in the industry by providing a more effective way to repair golf greens and the like. The general purpose of the invention, which will be described subsequently in greater detail, is to provide a new device and methods for properly repairing ball marks on a golf putting green, which can reduce the time needed to repair the ball mark and the costs of maintenance for golf course owners.

One object of the invention is to pull together portions of the turf that have become separated by ball impact. By bringing these portions of turf into proximity with each other, repair is facilitated and a relatively level surface is created.

Another objective of the present invention is to provide a device that can be used in repairing ball marks that decreases the time required to correctly repair ball marks.

Another objective of the present invention is to provide a device that can be used in repairing ball marks that is inexpensive.

Another objective of the present invention is to provide a device that can be used in repairing ball marks that is easy to use.

Another objective of the present invention is to provide a device that can be used in repairing ball marks that can be reused many times.

Another objective of the present invention is to provide a device that can be used in repairing ball marks that is enabled for convenient storage.

Another objective of the present invention is to provide a device that can be used in repairing ball marks that is disposed for displaying promotional or other identification type of information.

Another object of this invention is to provide a device that can be used in repairing ball marks which uses simple materials and components.

Another objective of the present invention is to provide a method for repairing ball marks that takes the guesswork out of repairing ball marks.

Another objective of the present invention is to provide for securing the invention to another object, such as, but not limited to, a belt.

The invention pertains to a pocket-sized mechanical golf ball mark repair device that essentially forces a golfer to properly repair ball marks on a golf putting green. The invention has an open and close design, which may be assisted with spring-loading, and when closed, is small enough to fit comfortably into the golfer's pocket. The invention actually squeezes the damaged sod together in one or more easy motions without destroying the roots; repairs the ball mark; thus expediting the repair/growth of the damaged green. This in turn improves the quality of play, reduces the time needed to repair the mark and reduces the costs of maintenance for golf course owners.

The invention may also include artwork, decorations, logos, advertising, ball markers, golf shoe cleat tools, golf club cleaning tools, and other similar attachments and/or enhancements.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Further objects and advantages of the present invention will be apparent from the following detailed description of a presently preferred embodiment which is illustrated schematically in the accompanying drawings.

BRIEF DESCRIPTION OF THE DRAWINGS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Other advantages and features of the invention are described with reference to exemplary embodiments, and are illustrated in the drawings in which.

DETAILED DESCRIPTION OF THE INVENTION

The invention is comprised of two Main Body, 010, parts, a Rivet, 020, and a Torsion Spring, 030. The Main Body, 010, parts are further comprised of Bent Tines, 012, disposed at the lower portion of the Main Body, 010, wherein the Bent Tines, 012, are positioned such that the Bent Tines, 012 of each opposing Main Body, 010, part are offset from each other. The Main Body, 010, part is further comprised by an upper portion. The Main Body, 010, has a cylindrical Cavity, 014, disposed in the top portion, which can be used for several purposes. The Cavity, 014, can accommodate a Belt Clip, 050, which is place in the Cavity, 014, and is either screwed, welded or riveted permanently in place. The Cavity, 014, can also be used to hold a Golf Ball Marker, 080, which is normally used to mark the location of a golf ball on a putting green. Ball markers are generally shaped like a coin and come in a variety of forms. One form of ball marker that is generally made of plastic, wood or metal, is coin shaped with a cylindrical stem coming out of the center of one side. This cylindrical stem can be placed into the Cavity Hole, 016, in the center of the Cavity, 014, so as to store the ball marker snugly in place with the tool. Another form of ball marker is shaped like a coin and is made of a ferrous metal that can be place into the Cavity, 014. When a ferrous metal, or equivalent, ball marker is used, it would be held in place by a thin flat magnet that is securely fastened in the Cavity, 014. Finally, the Cavity, 014, can be used to hold circular shaped advertising devices with labels, logos and the like, that are designed to fit into the Cavity, 014.

The preferred embodiment of the invention is made as follows:

1) Two of the Main Body, 010, parts are placed together so that all their Pivot Holes, 018, are aligned.
2) A Rivet, 020, is placed partially through two of the four Pivot Holes, 018.
3) The two Main Body, 010, parts are then opened so that the Torsion Spring, 030, is pushed in between the two Main Body, 010, parts.
4) When the Torsion Spring Hole, 032, is aligned with the four Pivot Holes, 018, in Main Body, 010, parts, the Rivet, 020, is pushed all the way through the four Pivot Holes, 018, and the Torsion Spring Hole, 032.
5) Once the Rivet, 020, is in place, a rivet tool is used to permanently secure the Rivet, 020, in place; thus, securely attaching the Main Body,010, parts, the Rivet, 020 and the Torsion Spring, 030, together.

6) One Latch Ring, 040, is then placed through the Latch Ring Holder, 070, which is located on the top of one of the two Main Body, 010, parts so that The Latch Ring, 040, freely swings and is enabled to perform the function of keeping the invention closed when it is not in use.
7) By pushing the Latch Ring, 040, onto or pulling the Latch Ring, 040, off of the Latch Section, 060, one can either close or open the invention.
8) The Main Body, 010, part has a cylindrical indentation or cavity on its top surface which can be used for several purposes. It can accommodate a Belt Clip, 050, which is fastened into the circular indentations on part 010 and is either screwed, welded or riveted permanently in place. It can also be used to hold traditional golf ball markers normally used to mark the location of a golf ball on a putting green. These ball markers are generally shaped like a coin and come in a variety of forms. One form that is generally made of plastic, wood or metal, is coin shaped with a cylindrical stem coming out of the center of one side. This cylindrical stem can be placed into the hole in the center of the cylindrical indentation or cavity so as to store the ball marker snugly in place with the tool. Another form of ball marker is shaped like a coin and is made of a ferrous metal that can be place into the cylindrical indentation or cavity on the tool. The coin shaped ball mark would be held in place by a flat magnet. Finally, these cylindrical indentations or cavities can be used to hold circular shaped advertising labels that are designed to fit into them.

Figure 1:
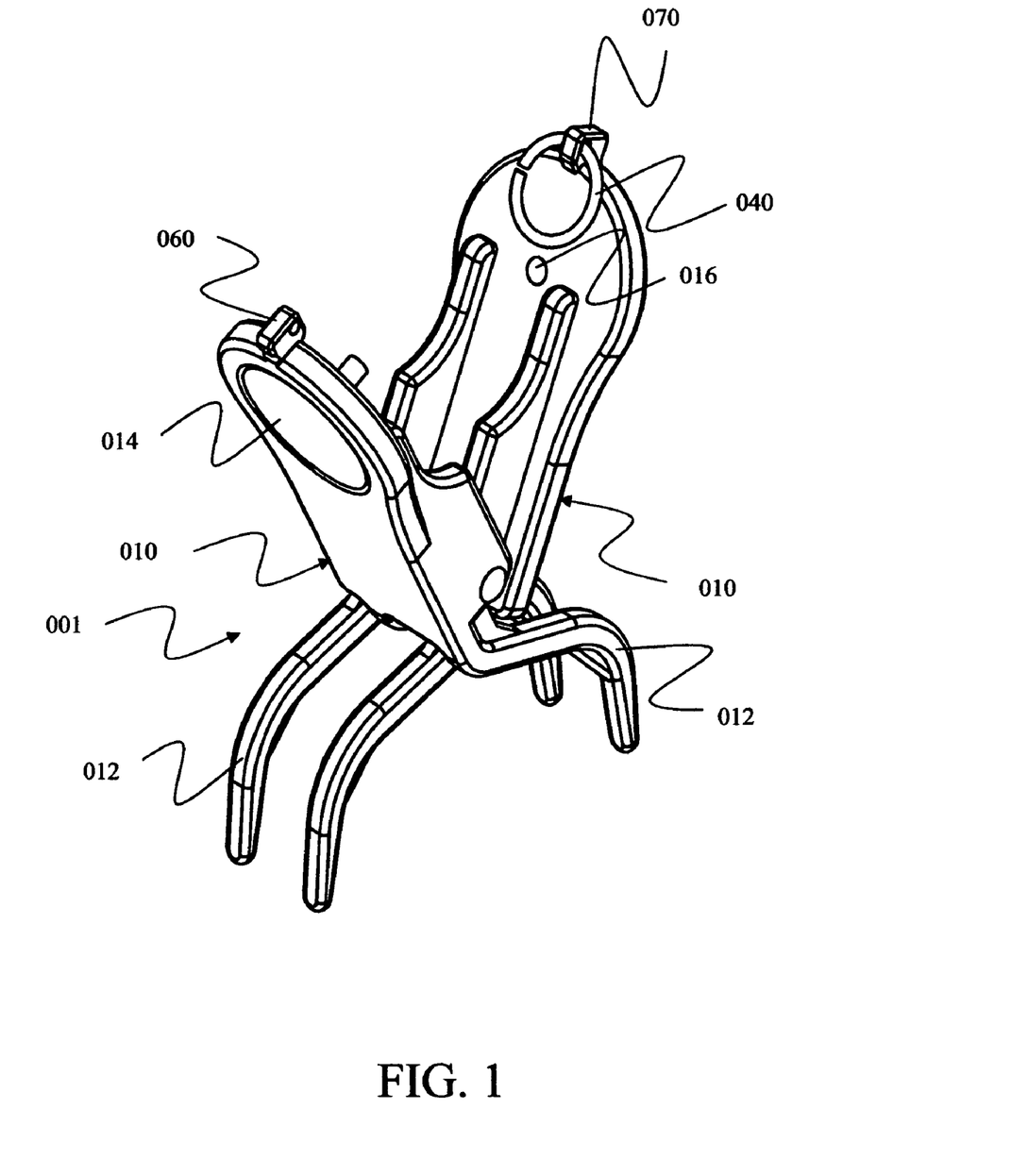
FIG. 1 is a perspective view of the invention in an open position.
Figure 2:
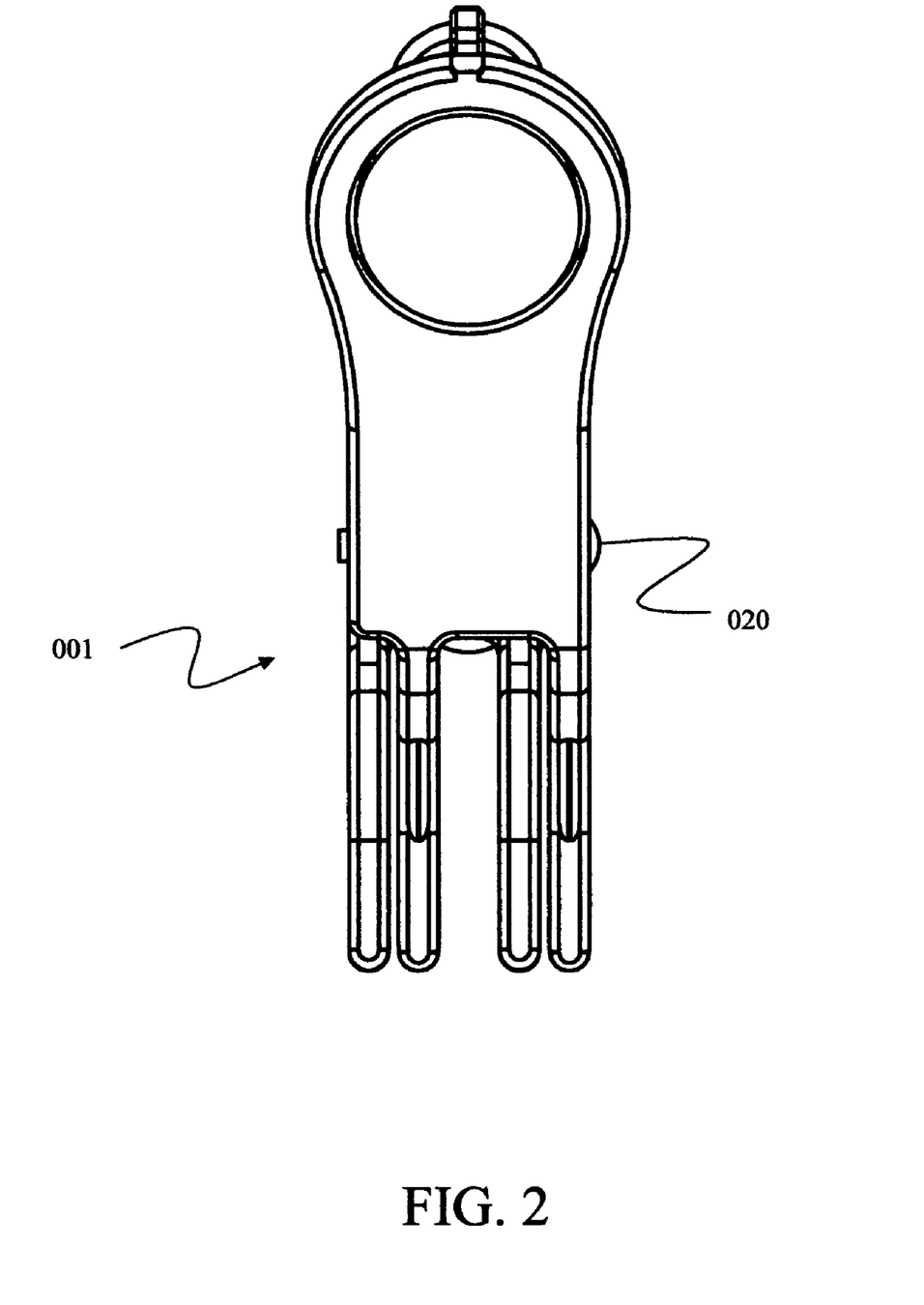
FIG. 2 is a left side view of the invention in a fully closed position.
Figure 3:
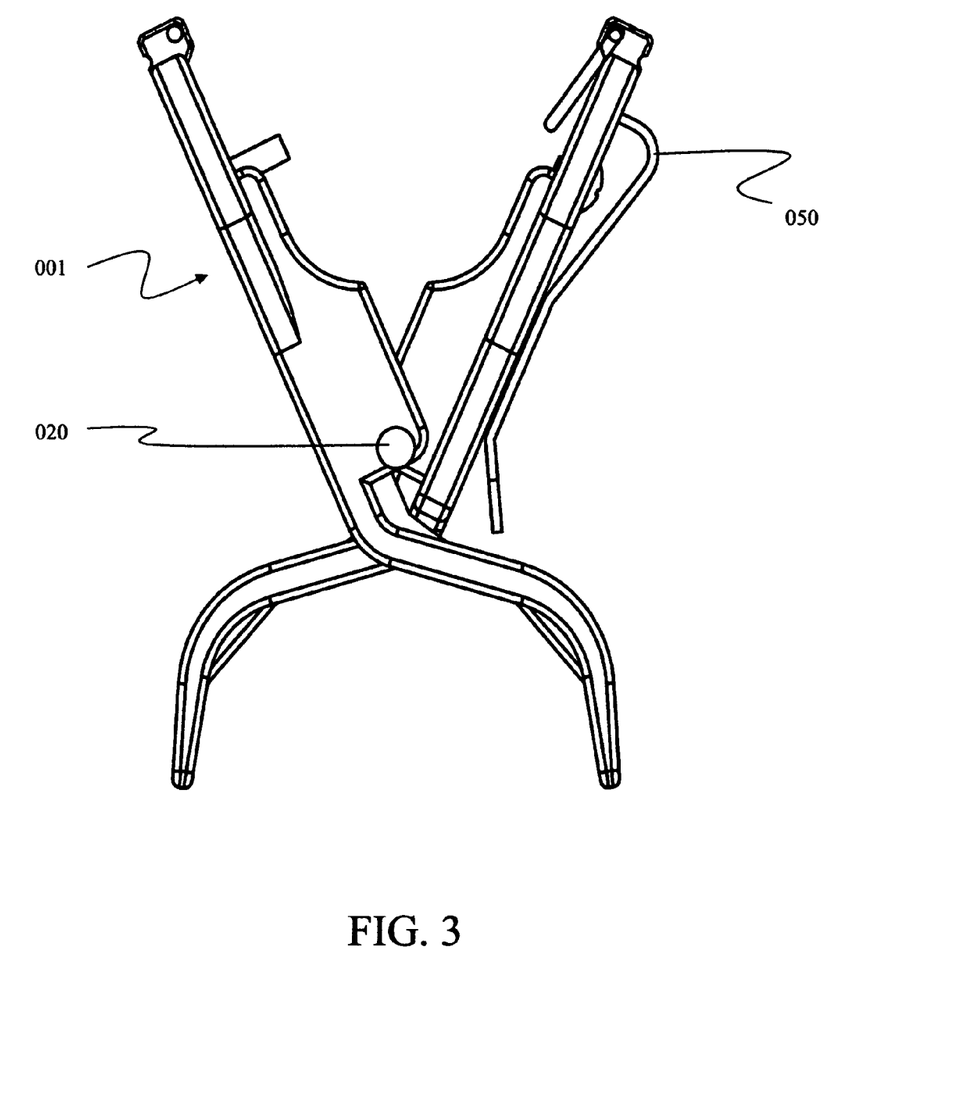
FIG. 3 is a front view of the invention in a fully open position.
Figure 4:
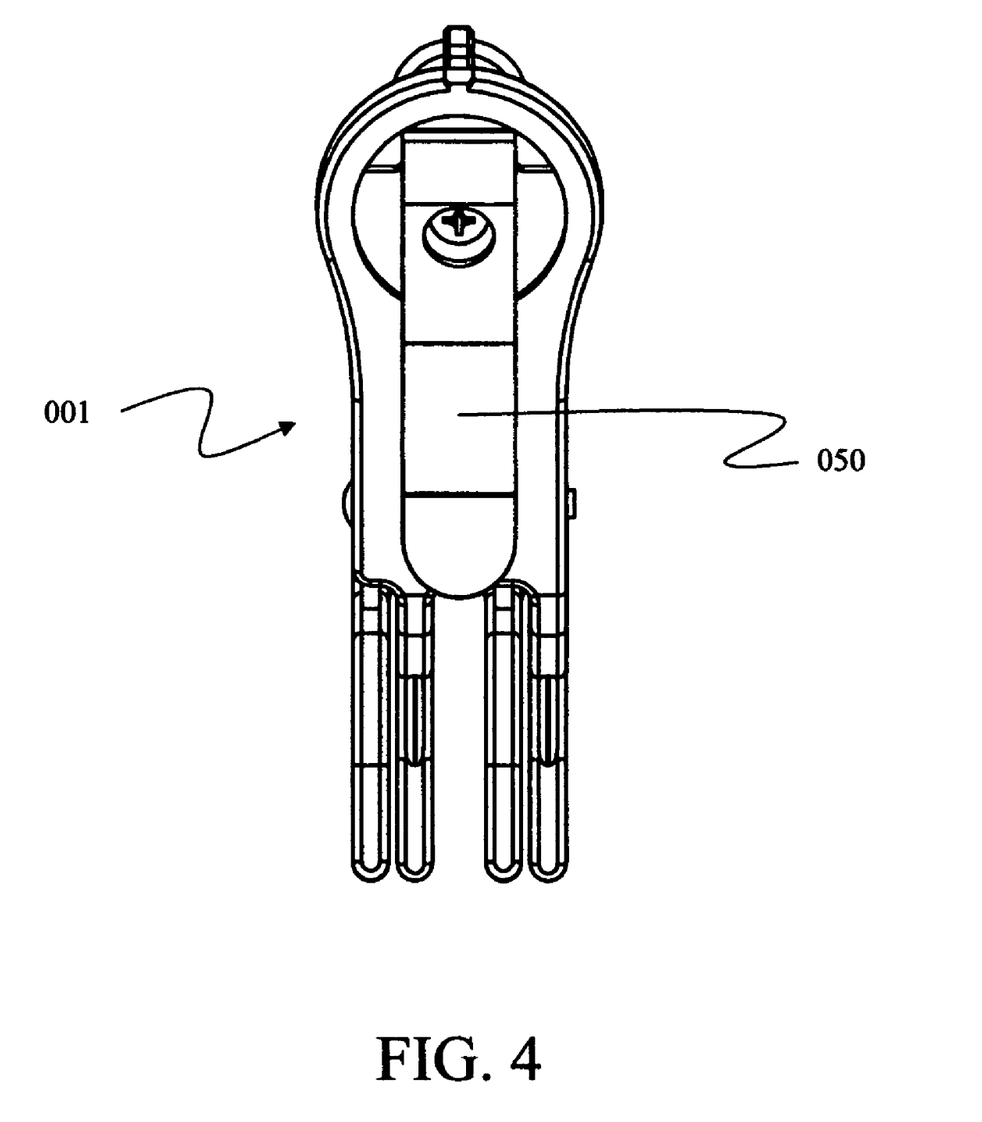
FIG. 4 is a right side view of the invention in a fully closed position.
Figure 5:
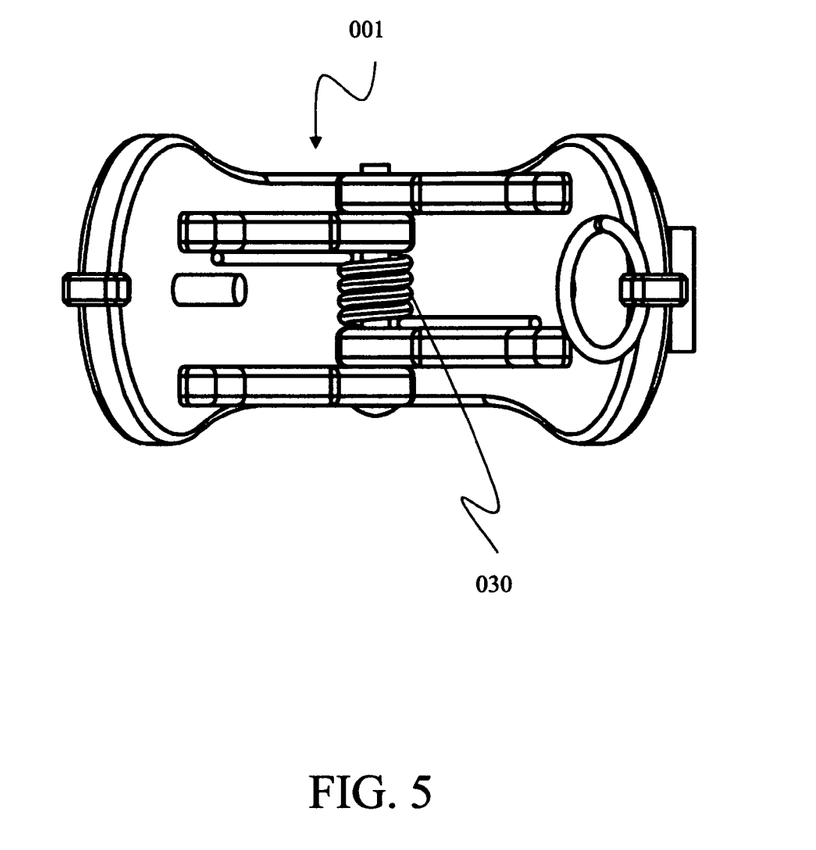
FIG. 5 is a top view of the invention in a fully open position.
Figure 6:
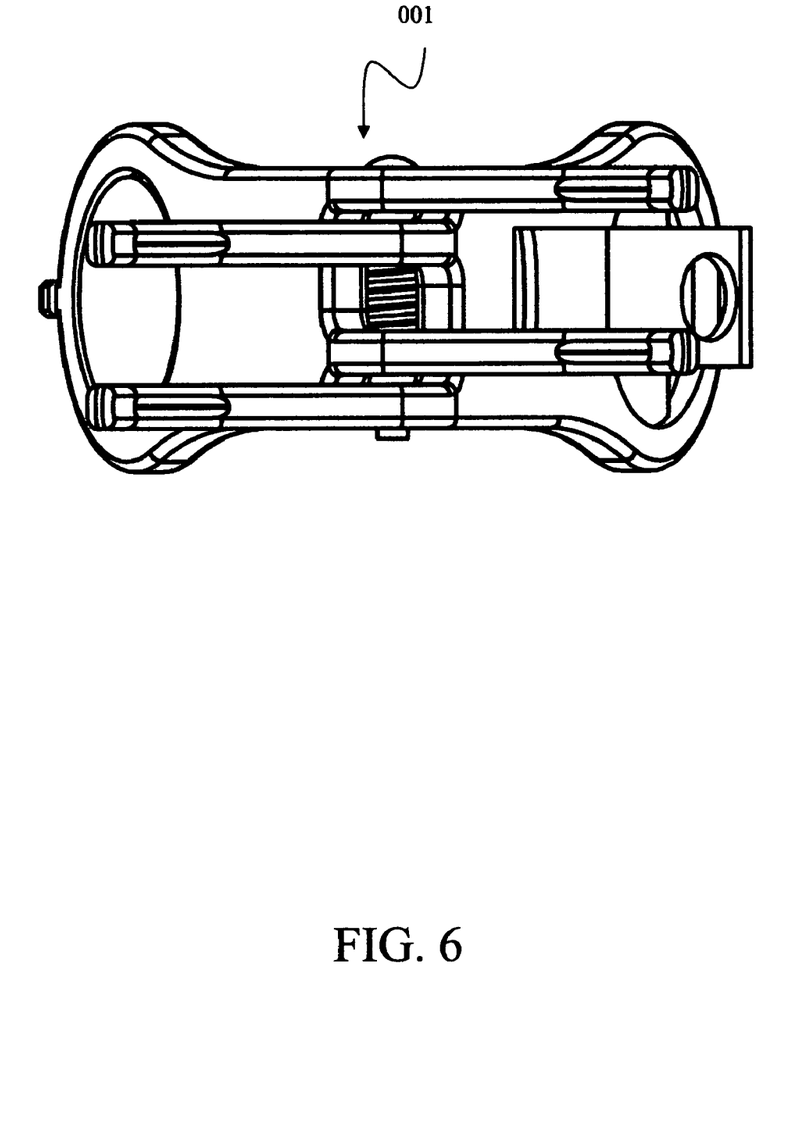
FIG. 6 is a bottom view of the invention in a fully open position.
Figure 7:
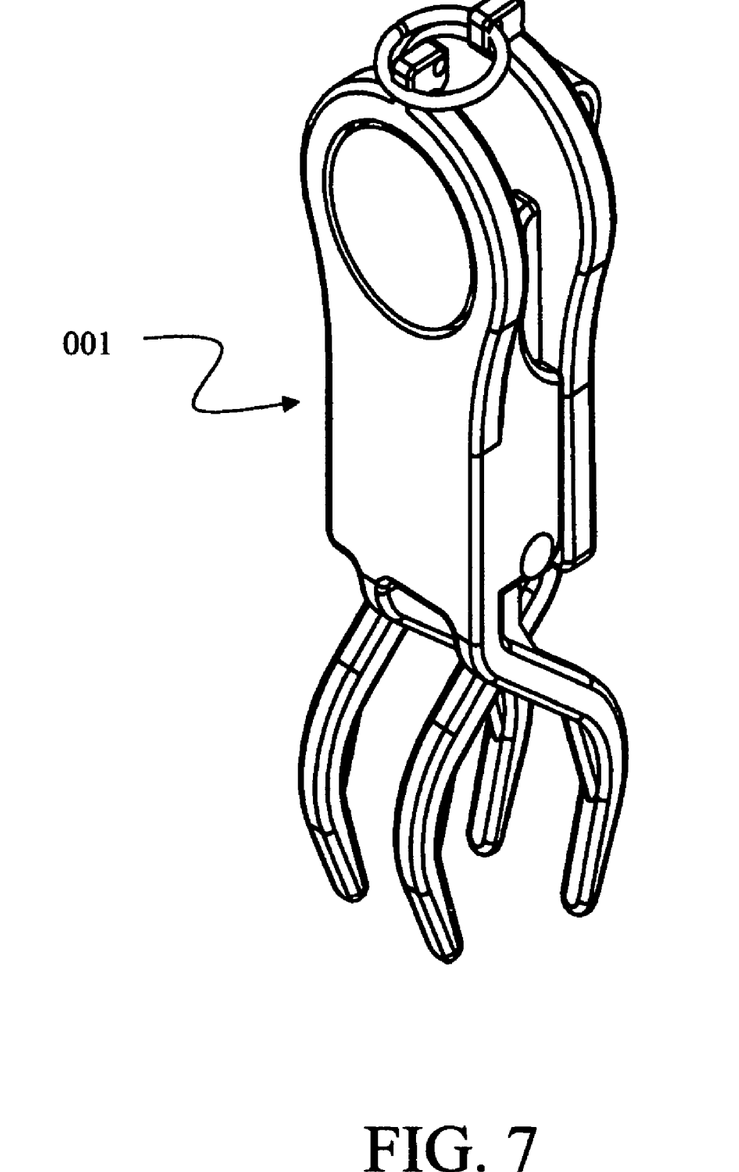
FIG. 7 is a perspective view of the invention in a fully closed position.
Figure 8:
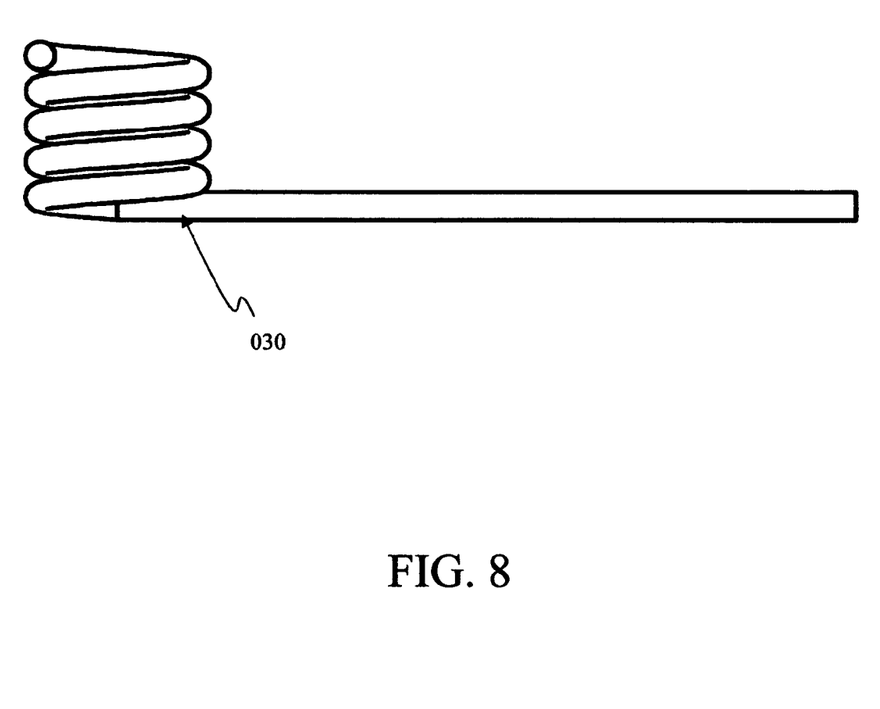
FIG. 8 is a detailed top view of the torsion spring portion of the invention.
Figure 9:
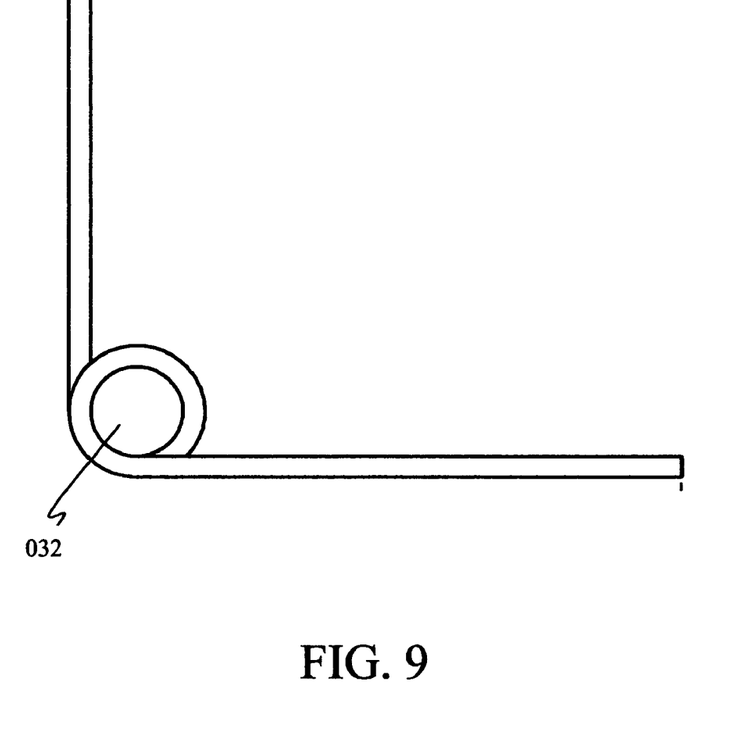
FIG. 9 is a detailed side view of the torsion spring portion of the invention.
Figure 10:
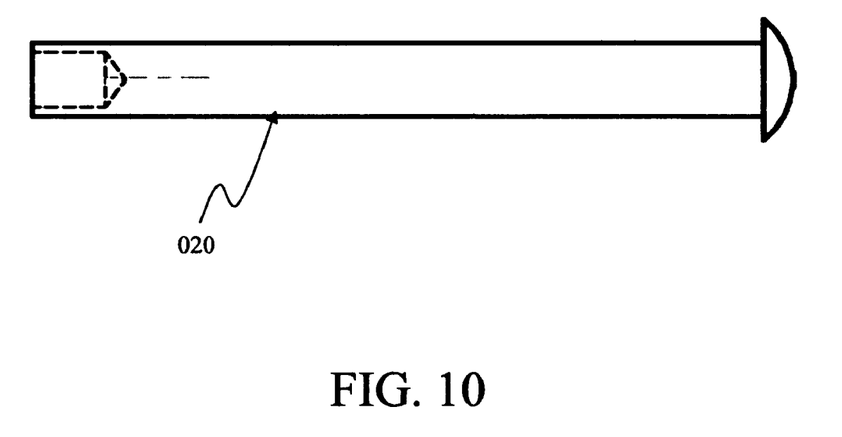
FIG. 10 is a detailed side view of the rivet portion of the invention.
Figure 11:
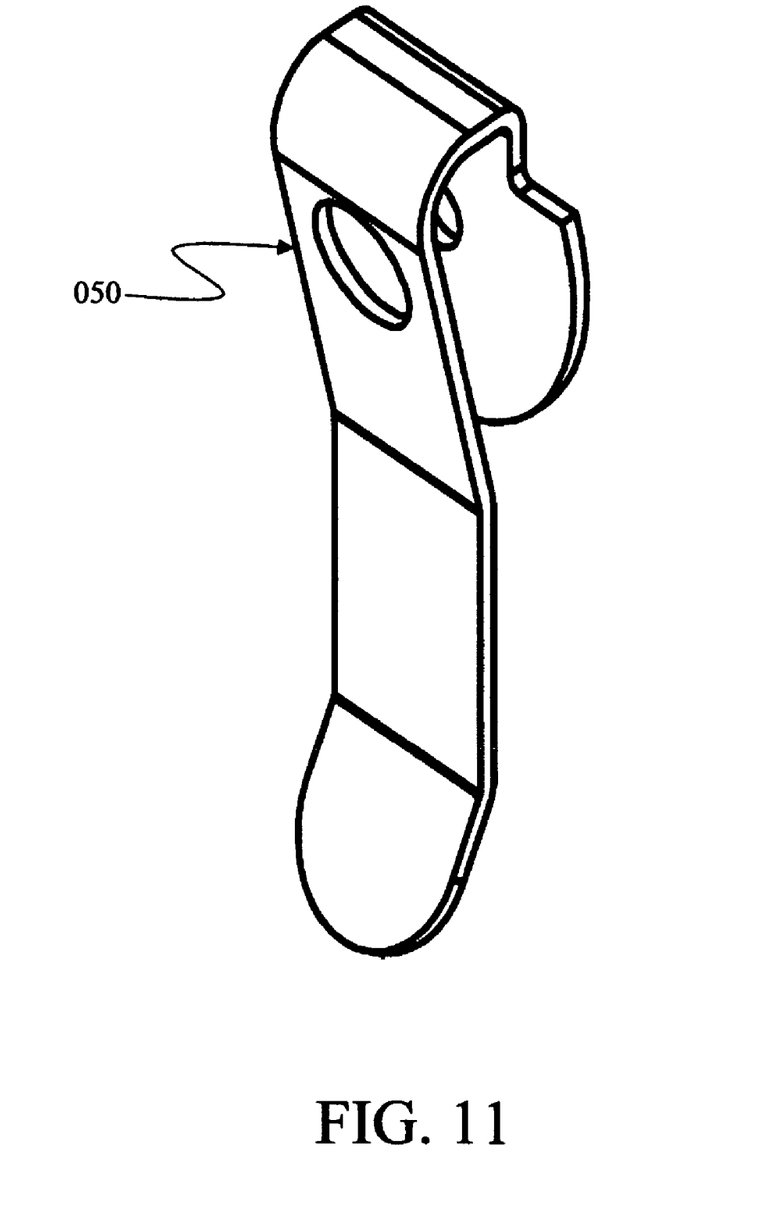
FIG. 11 is a detailed perspective view of the belt clip portion of the invention.
Figure 12:
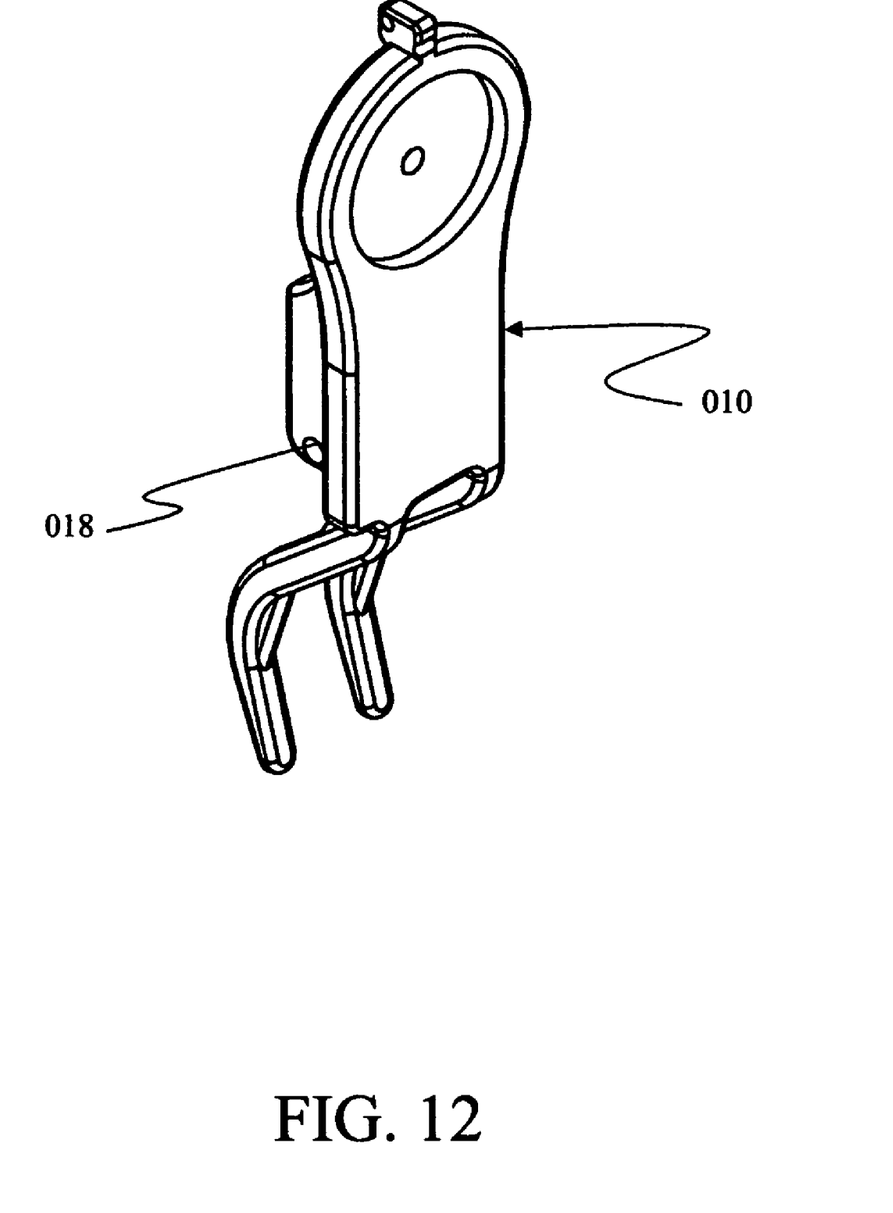
FIG. 12 is a back perspective view of the main body portion of the invention.
Figure 13:
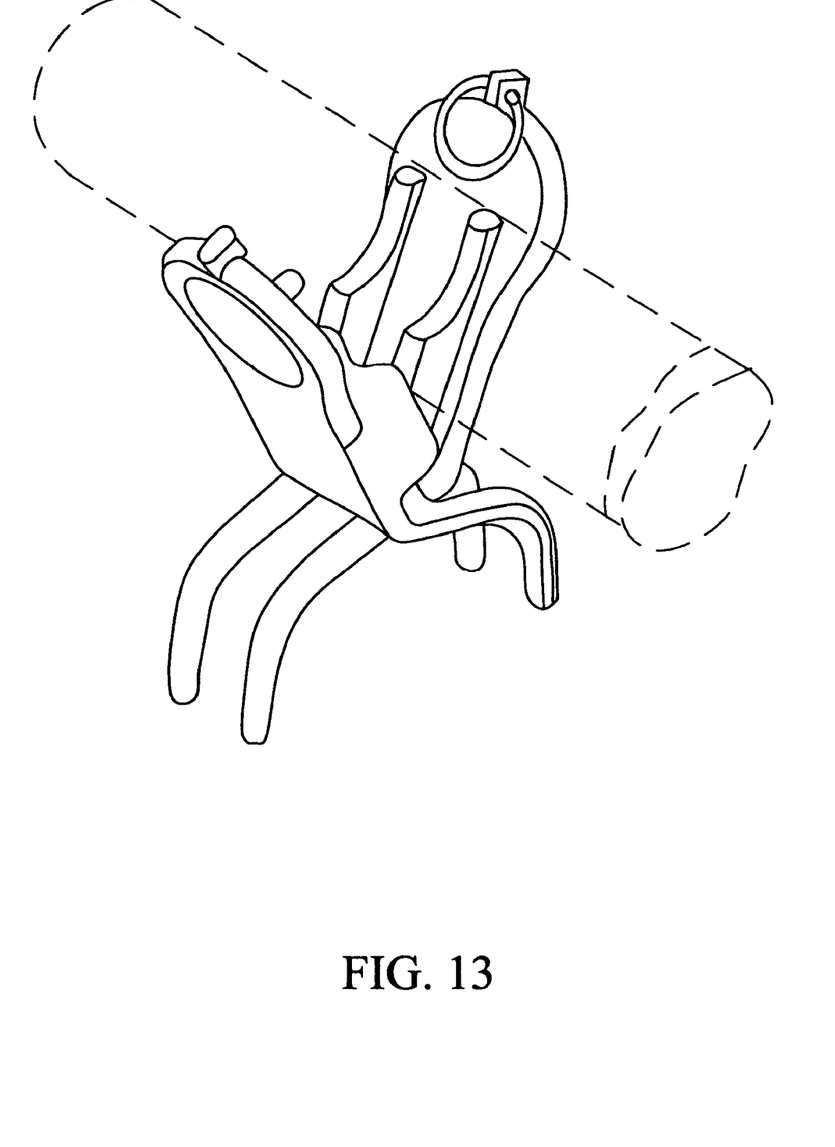
FIG. 13 is a perspective view of the invention being used to hold a cigar.
Figure 14:
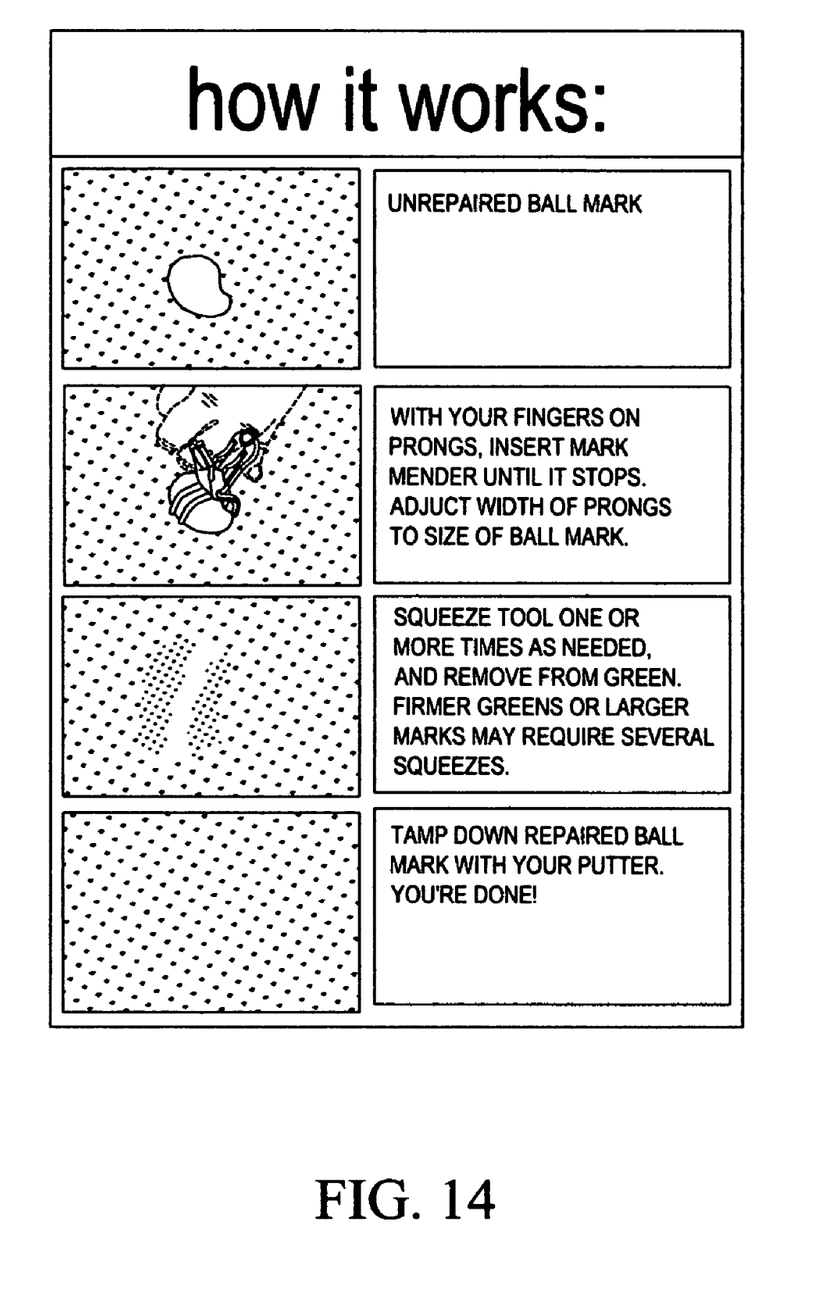
FIG. 14 shows the steps of how to use the invention to repair a ball mark.

The invention is used as follows:
1) Adjust the width of the prongs of the invention to the size of the ball mark.
2) With your fingers on the prongs, insert the invention into the green at the location of the ball mark until the invention stops.
3) Squeeze the top portions of the invention such that the prongs pull the grass together.
4) Repeat if necessary.
5) Remove the invention from the green.
6) Repeat 1 through 5 from a different angle if needed to pull the grass together.
7) Tamp down the repaired ball mark with your putter.

What is claimed is:
1. A mechanical golf ball mark repair tool comprising
a first member and a second member,
   whereas said first member has a first bottom, a first top, and a first mid-section,
   whereas said second member has a second bottom, a second top and a second mid-section,
   whereas said first member and said second member are hingably connected at said first mid-section and said second mid-section,
   whereas said first bottom terminates in a prong having at least one tine,
   whereas said second bottom terminates in a prong having at least one tine,
   whereas said first bottom moves in the opposite direction as said first top,
   whereas said second bottom moves in the opposite direction as said second top;
a first cavity disposed near the top outside of said first member;
a second cavity disposed near the top outside of said second member;
a latch ring disposed at the top of said second top; and
a latch section disposed at the top of said first top.
2. The mechanical golf ball mark repair tool of claim 1, further comprising
a golf ball marker,
whereas said golf ball marker is disposed for displaying promotional information.

* * * * *